(12) United States Patent
Ba-Tis et al.

(10) Patent No.: US 10,060,805 B2
(45) Date of Patent: *Aug. 28, 2018

(54) MEMS PITON-TUBE CAPACITIVE FORCE SENSOR

(71) Applicants: Faez Ba-Tis, Toronto (CA); Ridha Ben-Mrad, Toronto (CA)

(72) Inventors: Faez Ba-Tis, Toronto (CA); Ridha Ben-Mrad, Toronto (CA)

(*) Notice: Subject to any disclaimer, the term of this patent is extended or adjusted under 35 U.S.C. 154(b) by 10 days.

This patent is subject to a terminal disclaimer.

(21) Appl. No.: 15/091,259

(22) Filed: Apr. 5, 2016

(65) Prior Publication Data

US 2016/0216165 A1 Jul. 28, 2016

Related U.S. Application Data

(63) Continuation-in-part of application No. 14/449,544, filed on Aug. 1, 2014, now Pat. No. 9,306,475.

(51) Int. Cl.
*H02N 1/06* (2006.01)
*G01L 1/14* (2006.01)
*H02N 1/00* (2006.01)

(52) U.S. Cl.
CPC .......... *G01L 1/146* (2013.01); *H02N 1/006* (2013.01)

(58) Field of Classification Search
CPC .................. H02N 1/006; G01L 1/146

USPC .......................................... 310/309
IPC ........................................... H02N 1/06
See application file for complete search history.

(56) References Cited

U.S. PATENT DOCUMENTS

| 9,306,475 | B1* | 4/2016 | Ba-Tis | H02N 1/006 |
| 9,529,470 | B2* | 12/2016 | Ba-Tis | G06F 3/0414 |
| 2016/0216165 | A1* | 7/2016 | Ba-Tis | G01L 1/146 |

* cited by examiner

*Primary Examiner* — John K Kim
(74) *Attorney, Agent, or Firm* — Nasser Ashgriz; UIPatent Inc.

(57) ABSTRACT

A highly sensitive MEMS capacitive force sensor offering a wide force measurement range is disclosed. The force sensor utilizes a piston-tube electrode configuration that enables the use of a wide area of the electrodes. Therefore, a high sensitivity for force detection is achieved. The force sensor consists of a lower structure, an upper structure, and a force contact platform. The lower structure contains a plurality of fixed electrodes that are attached to the base and have a plurality of teeth (pistons). Those teeth form the fixed sensing electrodes of the force sensor. The upper structure comprises of a moving section that has a plurality of apertures. The moving section is attached to the substrate via restoring mechanical springs. A force contact platform is attached to the moving electrode and provides the foundation for the force to be applied. The force sensor is able to measure concentrated and distributed force (mechanical pressure).

10 Claims, 6 Drawing Sheets

MEMS PITON-TUBE CAPACITIVE FORCE SENSOR

RELATED APPLICATIONS

This application repeats a substantial portion of prior application Ser. No. 14/449,544, filed Aug. 1, 2014, and adds and claims additional disclosure not presented in the prior application. Since this application names the inventor or at least one joint inventor named in the prior application, it may constitute a continuation-in-part of the prior application.

FIELD OF THE INVENTION

The invention relates to the field of MEMS capacitive force sensors which could be used in a variety of electronic devices for force sensing such as sensors embedded in touch screens or user input buttons.

BACKGROUND OF THE INVENTION

MEMS force sensors are used to detect small input force that ranges from micro-Newtons to milli-Newtons. Two main technologies are used to detect mechanical force in such scales: piezoresistive and capacitive force sensors. Piezoresistive force sensors offer several advantages such as simple design of the sensor and simple readout circuit. However, they are sensitive to the temperature changes. An example of such sensors is presented in the U.S. Provisional Patent Application No. 2014/0007705 A1, which is used to detect touch force of the user finger on display screens. Capacitive force sensors provide accurate measurements at micro-Newton ranges and they are not sensitive to temperature changes, but when force range increases the sensitivity of such sensors is compromised.

The present invention of MEMS piston-tube capacitive force sensor is able to overcome the limitations of conventional MEMS capacitive force sensors. The sensor is able to detect small forces in the range of few micro-Newtons as well as large input forces in the range of 10's of milli-Newtons. This is due to the high sensitivity of the piston-tube electrode configuration that enables the detection of small displacements of the rotor of the sensor in response to the input force, and to the large stroke that the rotor can travel, and to the high stiffness of the flexure mechanism of the rotor.

MEMS piston-tube capacitive sensor force can also withstand over limit input force, which makes such sensors useful for user input devices such touch screen or hand held devices that require an input in the form of touch force applied by the finger of a user or by a stylus.

SUMMARY OF THE INVENTION

The present invention discloses a MEMS capacitive force sensor that can detect an input force by utilizing the MEMS electrostatic piston-tube (tooth-aperture) electrode configuration that was previously disclosed in U.S. patent application Ser. No. 14/449,544 and PCT/IB2014/001498 and, which are incorporated by reference herein below.

The main features of the design that enable the piston-tube force sensor to offer measurements over a very wide scale of input force ($\mu$N to mN) include the high sensitivity of the sensor for force detection and its ability to measure a wide range of the input force. The high sensitivity of the piston-tube electrode configuration is due to the fact that any small displacements of the rotor corresponding to an applied mechanical force/pressure induce measurable changes in the capacitance of the structure which can be detected by the sensing readout circuit. The piston-tube electrode configuration is also able to detect a wide range of input force as the high stiffness of the sensor structure (thick springs) and large stroke of the rotor of the sensor (in the ranges of 10's of $\mu$m) enables the sensor to measure large forces.

Mechanical stopper are also easily made during the fabrication of the sensor so that it can withstand forces that are beyond the range of the input force without causing the sensor to be damaged or short circuited.

The preferred embodiment of the piston-tube capacitive force sensor comprises a lower structure which forms the stator, an upper structure which forms the rotor that is attached to the substrate through springs, and the force contact platform that is placed on the moving rotor. When an input force is applied to the force contact platform, the rotor of the sensor moves downward leading to a change in the capacitance between the sensing piston and tube electrodes. A capacitance read-out circuit is used to measure these changes corresponding to the applied force.

The sensing electrodes (pistons) in the stator are electrically connected (having a single polarity) to measure only the magnitude of the force, or can be divided into sections to sense the magnitude and the position of a concentrated force relative the rotor of the sensor. Different structures of the piston-tube electrode configuration designs that are disclosed in the U.S. application Ser. No. 14/449,544 and PCT/IB2014/001498 can be used to sense the force.

It will be readily apparent to the one with ordinary skill in the art that this invention can be altered in many ways, used in many applications for force measurement without departure from the soul of the invention. It will also be readily apparent to the one with ordinary skill in the art that this force sensor can be used as displacement sensor, as the applied force is proportional to the springs' stiffness and the displacement; once the force is known, the displacement is determined.

DETAILED DESCRIPTION OF THE INVENTION

Figure 1A:
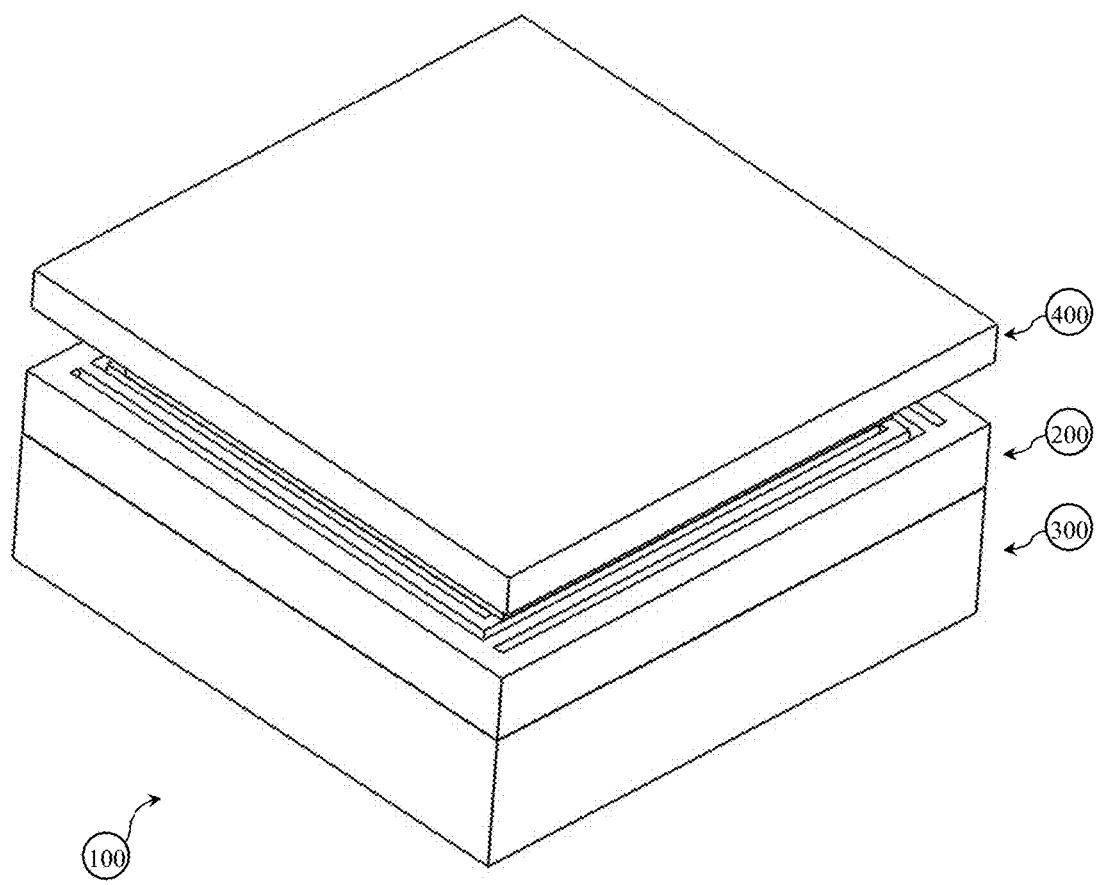
FIG. 1A shows a perspective view of a MEMS capacitive piston-tube force sensor, according to an example embodiment of the present invention.
Figure 1B:
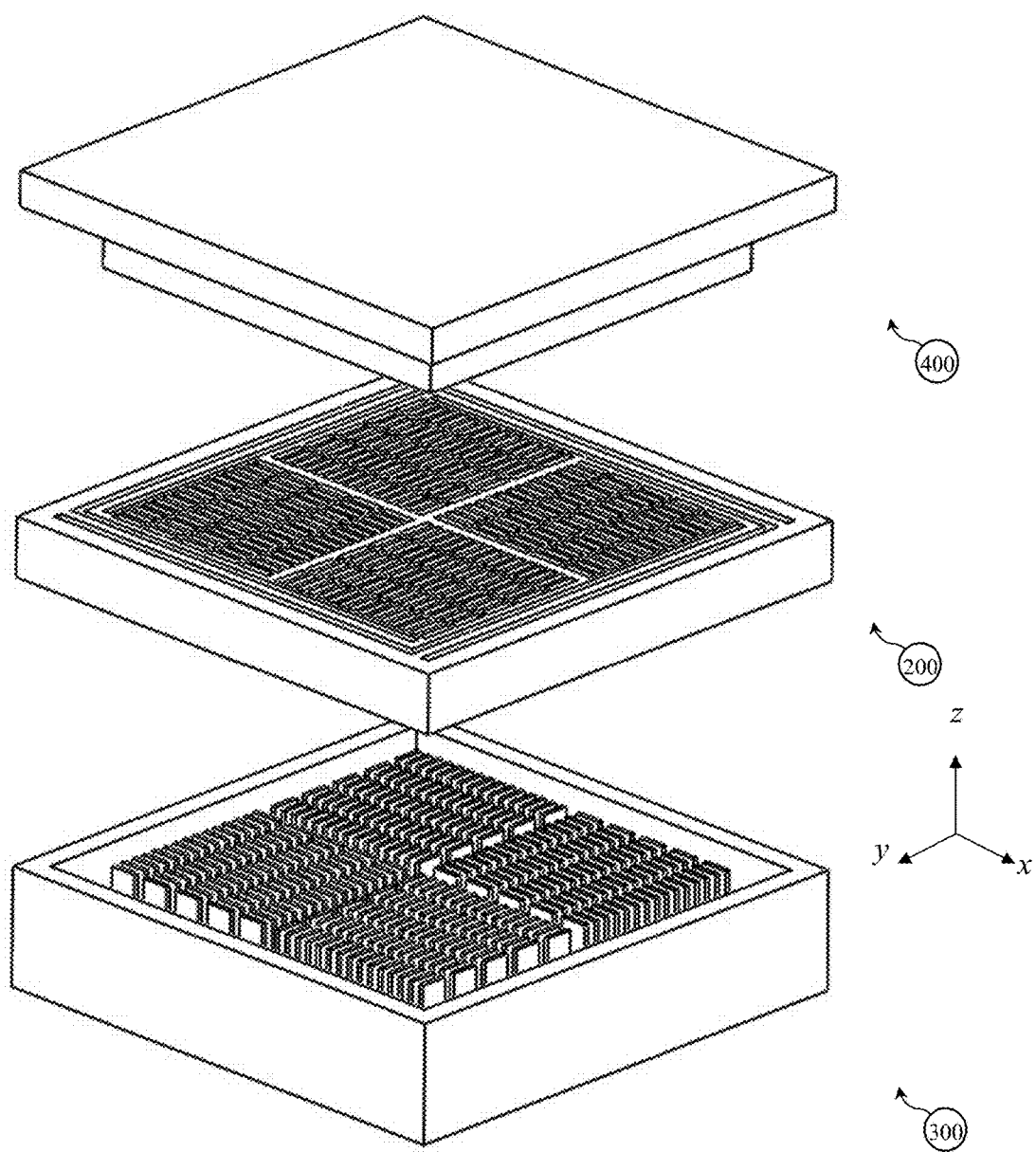
FIG. 1B shows an exploded perspective view of the MEMS capacitive piston-tube force sensor shown in FIG. 1A.
Figure 2:
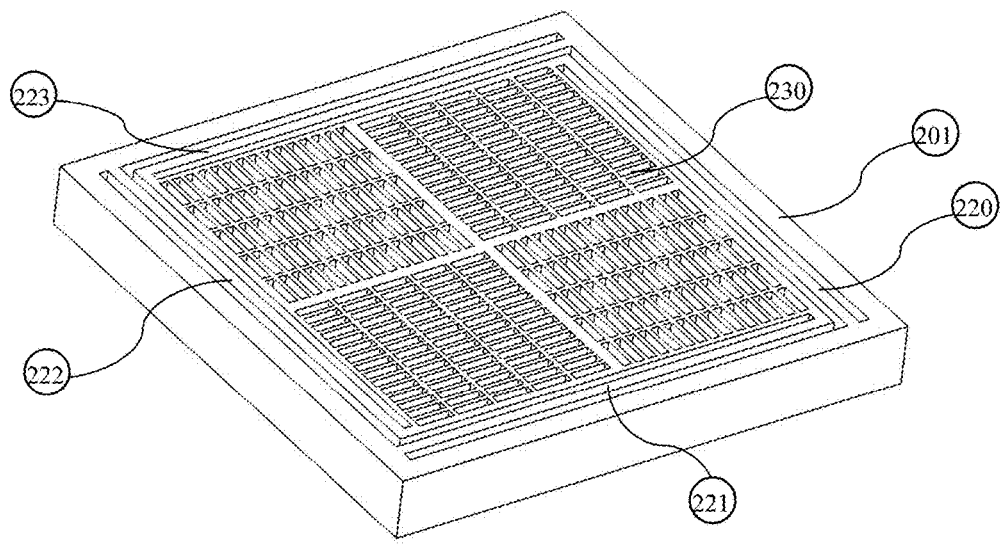
FIG. 2 is a perspective view illustrating the upper structure (the rotor, springs, and outer periphery) of the piston-tube capacitive force sensor.
Figure 3A:
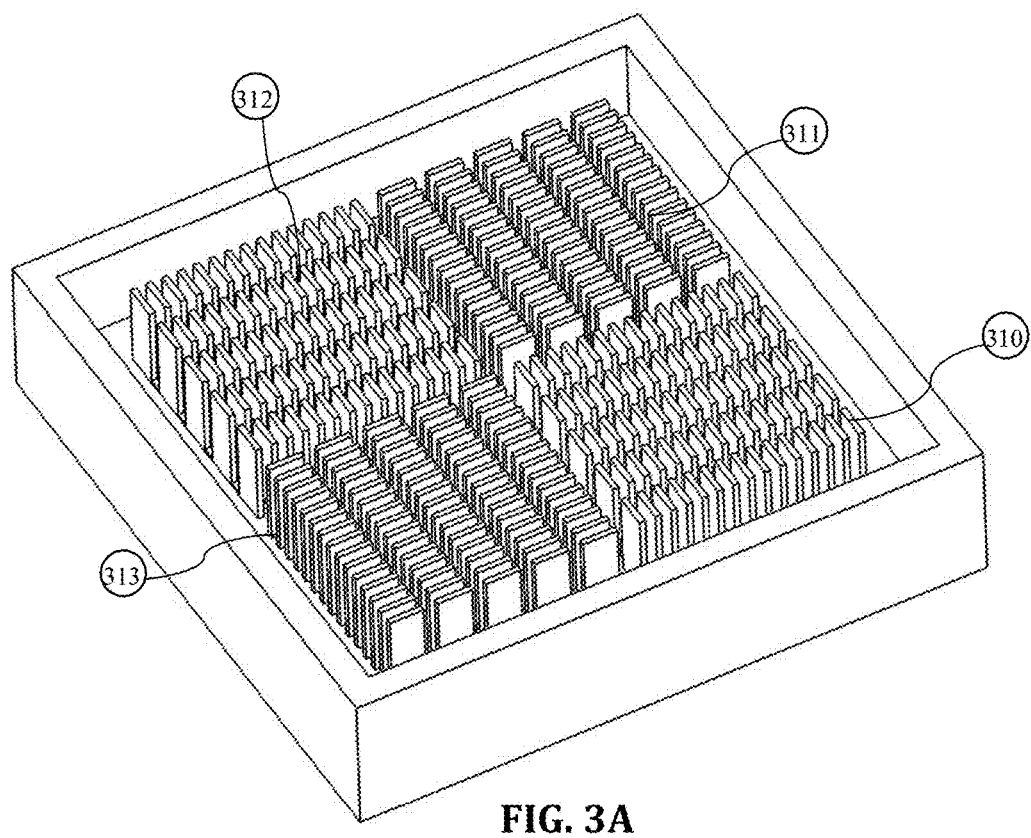
FIG. 3A is a perspective view illustrating the lower structure (stator) of the piston-tube capacitive force sensor.

The preferred embodiment of the MEMS capacitive piston-tube (tooth-aperture) force sensor 100 is illustrated in FIG. 1-7. It comprises a lower structure 300 that forms the stator, an upper structure 200 that houses the rotor 230 and mechanical springs 220, 221, 222, 223, and a force contact platform 400. The lower structure 300 is shown in FIG. 3, and it forms a plurality of rectangular-shaped pistons (teeth) 310, 311, 312 313, and the upper structure 200 is shown in FIG. 2, and it houses the rotor which consists of a plurality of rectangular-shaped tubes (apertures) 230, that correspond to the pistons in the lower structure.

Figure 3B:
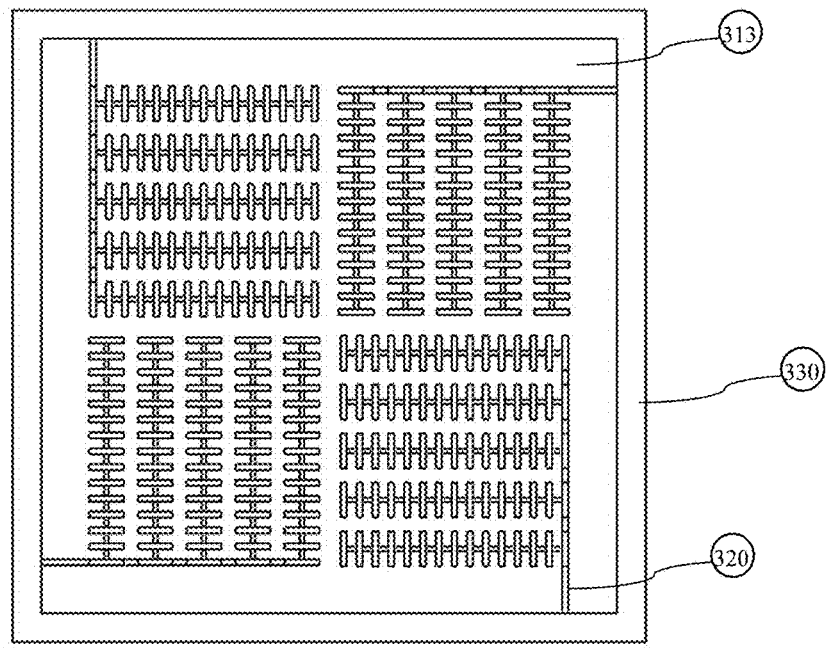
FIG. 3B is a perspective view illustrating the small thickness routing layer that connects the pistons in each sub-array in the lower structure (stator) of the piston-tube capacitive force sensor.

The pistons (teeth) form one or multiple sensing electrodes (preferably four), and they protrude vertically towards the upper structure and extend horizontally along the two in-plane axes (x and y). Each sensing electrode is electrically isolated from other sensing electrodes by utilizing the Buried Oxide (BOX) layer 313 of an SOI wafer or any other dielectric (i.e. insulation) layer. The division of the pistons into multiple arrays enables the detection of the force magnitude as well as force position with respect to the rotor when the force is concentrated. When the applied force is distributed and the magnitude of the force is only required to be sensed, all pistons are electrically connected and there is no need for the insulation layer 313. The pistons within each single group (sensing electrode) are electrically connected to each other via a small thickness (height) layer 320 forming a single capacitor with the moving (common) electrode in the upper structure. It will be readily clear to the one with ordinary skill in the art that this layer 320, shown in FIG. 3B, is connected to the outer fixed periphery of the sensor 330, which is divided into different electrical pads by means of DRIE etching up to the insulating layer.

The tubes (apertures) 230 form the moving electrode, which is a common electrode that in conjunction with the lower sensing electrodes 310, 311, 312, 313, make up the capacitors. The tubes (apertures) are rectangular through holes, and they are vertically aligned with the pistons (sensing electrodes). The cross-section of the tubes is larger than that of the pistons so that the pistons penetrate along the tubes during the application of the force. The height (thickness) of the apertures (tubes) is generally less than that of the pistons (teeth) such that they fully engage without causing short circuit during the engagement of the pistons and the tubes while sensing. The moving structure containing the tubes is attached to the outer fixed periphery 201 of the sensor by multiple supporting springs 220, 221, 222, 223.

The force contact platform 400 is placed on the rotor of the sensor and can be made of any solid materials; light weight materials such as glass or plastic is preferable. A glass force contact platform can be attached to the rotor by means of ionic bonding during the fabrication of the sensor or by an adhesive. The force contact platform provides a means for the application of the force and also works as a mechanical stopper for the moving rotor during the application of an input force that exceeds the range of the sensor or severe shocks.

Figure 4:
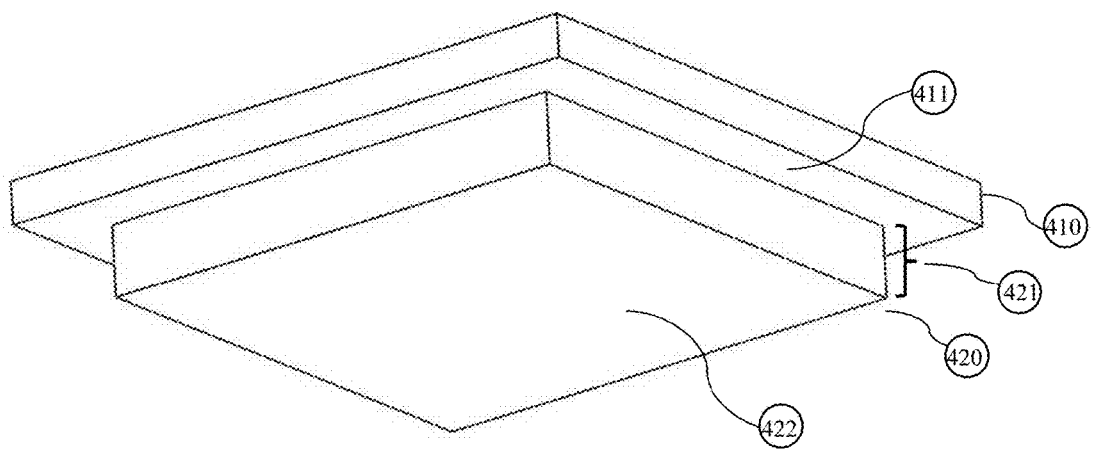
FIG. 4 is a perspective view illustrating the force contact platform that forms the foundation on which the input force is applied.

The force contact platform consists of two parts: the upper 410 and lower 420 as shown in FIG. 4. The bottom face 422 of the lower part is designed to fit the area of the moving rotor and has a height 421 which is equal to the maximum translation stroke of the moving rotor. The upper part 410 is larger in area than the lower part and can be set equal to the area of the whole sensor to provide a large fill factor when multiple of these sensors are used in an array structure. The upper part limits the motion of the rotor to the desired maximum translation or rotation stroke to avoid any short circuit between the pistons and tubes and also to prevent the sensor from being destroyed when forces that exceed the maximum force the sensor can handle are applied.

Figure 5:
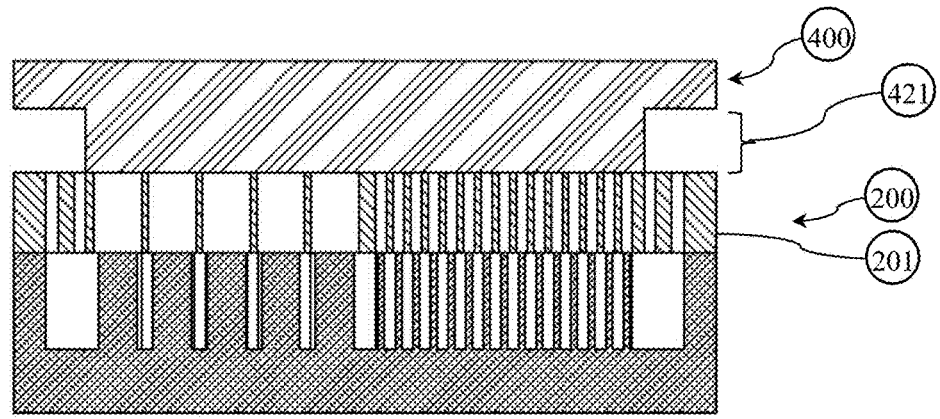
FIG. 5 shows a cross-sectional view illustrating the piston-tube capacitive force sensor at rest, no input force is applied.
Figure 6:
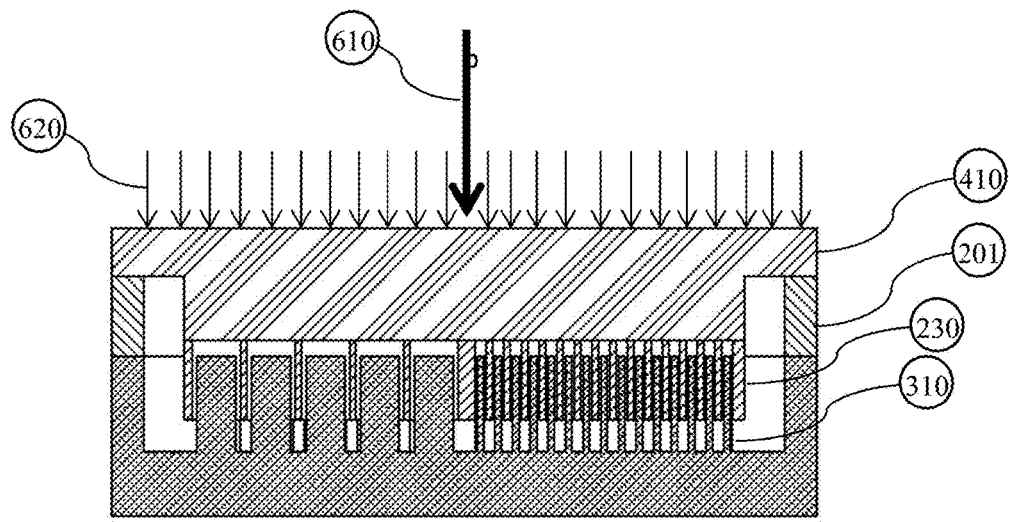
FIG. 6 shows a cross-sectional view illustrating the piston-tube capacitive force sensor during the application of an input force, concentrated at the center of the rotor or distributed over the entire rotor, on the force contact platform.

When no input force is applied, the rotor is at rest as shown in FIG. 5. When an external mechanical force (concentrated 610 at the center of the rotor or distributed 620 over the entire rotor), refer to FIG. 6, is applied towards the force contact platform (i.e. the negative direction of the z-axis), the relative engagement of the moving structure (tubes) and the lower structure (pistons) increases. The change of capacitance between the moving electrode (tubes) and the sensing electrodes (pistons) is detected by the capacitive read-out circuit. Hence the force can be measured.

The upper part 410 of the force contact platform works as a mechanical stopper when the rotor 230 of the sensor reaches the maximum stroke. The bottom surface 411 of this upper part hits the outer fixed periphery 201 of the sensor at the maximum stroke before the bottom surface of the rotor hits the lower structure. This is shown in FIG. 6. Such mechanism protects the actuator against large forces that exceed the capacity (i.e. range) of the sensor and prevents the short circuit between the upper and lower structures.

Figure 7:
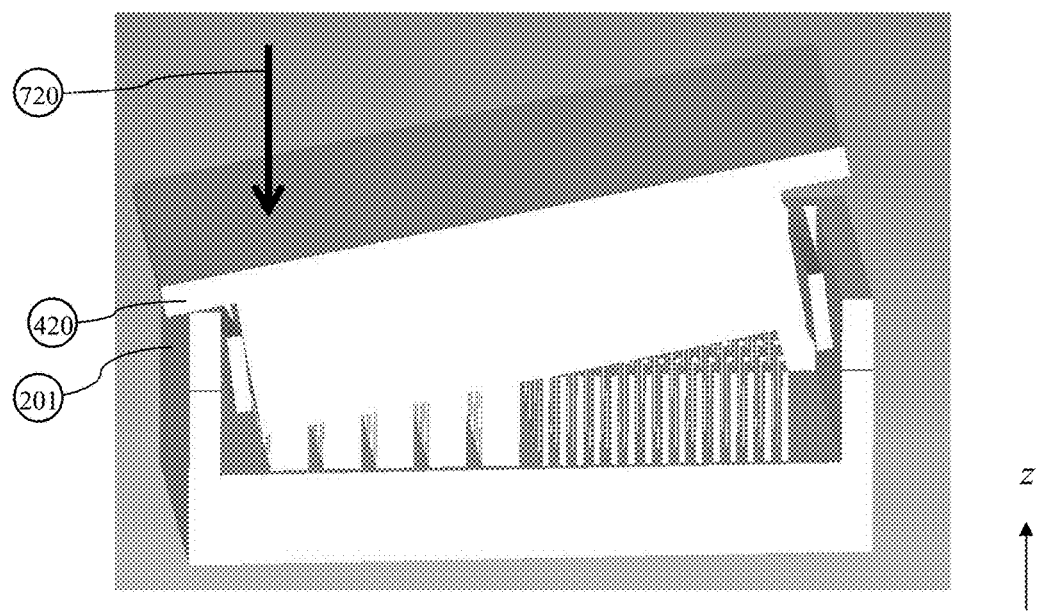
FIG. 7 shows a cross-sectional view illustrating the piston-tube capacitive force sensor during the application of an eccentric concentrated force on the rotor.

When an eccentric external concentered force 720, refer to FIG. 7, or a distributed force that can be represented through an equivalent eccentric external concentrated force also as shown by 720 is applied, the relative motion of the moving electrode (tubes) with respect to the fixed electrodes (pistons) are rotations about the in-plane axes. The resulting change in the engagement of the tubes and the corresponding pistons is largely concentrated in one half of the force sensor structure leading to a change in the capacitance which can be detected by the read-out circuit. Thus, the quadrant to which the force is applied can be known. The upper part 420 of the force contact platform also works as a mechanical stopper as this part hits the outer fixed periphery before the inner walls of the tubes hits the outer walls of the pistons. It would be readily apparent to the one who is skilled in the art that the dimensions of the pistons and tubes in FIG. 7 are not real as they are drawn only for illustration purposes. In a real design, a consideration is taken for the size of the horizontal gaps between the walls of the pistons and tubes such that the inner walls of the tubes do not touch the outer walls of the pistons when the maximum angle of rotation is reached.

The configuration of the springs holding the moving structure can be designed in many ways as it will be clearly apparent to one skilled in the art. One may use suspension springs that extend radially to support the tubes. Another preferred configuration of springs is that the springs extend along the periphery of the tubes' plate which is the preferred configuration as it allows for a wider area for the application of the force, it enables the use of a wide area of the electrode capacitance, and it provides a high fill factor when a number of these sensors are connected in an array style.

It would be apparent to one skilled in the art that force sensitive touch screens is one of the applications of this sensor as a matrix of these sensor can be placed beneath a Liquid Crystal Display (LCD) or LED display on any type of display screen or pad so that when a user applies a force to the screen, the MEMS capacitive piston-tube force sensors are activated providing the x-y position and the magnitude of the force.

It can also be apparent that the disclosed force sensor can be used as a weight measurement sensor as the weight is a force. It can also be used as a displacement sensor by detecting the amount of force applied and having prior knowledge of the stiffness of the rotor springs.

What is claimed is:

1. A MEMS capacitive force sensor, comprising:
   a. a first base plate having a top surface and a thickness;
   b. an array of spaced apart teeth electrodes constructed in the thickness of said base plate;
   c. each said tooth electrode having a tooth-shape, a tooth-length, a tooth-height, a top, and a tooth-thickness;
   d. said array of teeth being grouped in one or multiple sub-arrays of teeth each comprising one or more teeth, wherein the teeth in each sub-array of teeth being electrically connected to each other and electrically isolated from the other sub-arrays of teeth;
   e. each said sub-array of teeth being electrically addressable, whereby each said sub-array of teeth forms a fixed sensing electrode of said force sensor;
   f. a second plate attached to said base plate and having a structure sized to fit on said base plate, said second plate having a fixed peripheral structure and a moving structure, whereby the fixed structure is attached to the base plate and the moving structure forms a moving sensing electrode of the said force sensor;
   g. an array of spaced apart apertures constructed in the thickness of the said moving structure of the said second plate;
   h. said array of apertures sized and designed to receive and interdigitate with said array of teeth, and each said apertures having a length, width and a height, whereby said array of apertures forms a moving electrode of said force sensor;
   i. a plurality of spring means supports and holds said moving structure aligned with respect to said array of teeth and returns said moving structure to its initial position in the absence of an external force, each said spring having a length, a thickness, and a height;
   j. a force contact platform placed on said moving structure of said second plate,
   whereby the teeth of the base plate engage with the apertures of the second plate in response to the external force exerted on the force contact platform, and the magnitude of said force is determined by means of capacitance change detection that is formed between the teeth and apertures, and whereby the force contact platform is used as a mechanical stopper to protect the sensor from short circuit or damage during severe mechanical shocks or when a large input force exceeding the range of the sensor is applied.

2. The MEMS capacitive force sensor of claim 1, wherein said sub-arrays of teeth are electrically connected forming one fixed sensing electrode.

3. The MEMS capacitive force sensor of claim 1 or 2, wherein said array of teeth electrodes being arc shaped and being radially co-centric with a predefined radial spacing.

4. The MEMS capacitive force sensor of claim 1 or 2, wherein said array of teeth electrodes being substantially rectangular, circular, triangular, trapezoidal, pentagonal, or hexagonal shaped, and each said sub-array of teeth being aligned linearly along their length and forming several linear rows in each said sub-array.

5. The MEMS capacitive force sensor of claim 1 or 2, wherein said array of teeth electrodes being substantially rectangular, circular, triangular, trapezoidal, pentagonal, or hexagonal shaped, and each said sub-array of teeth being aligned radially along their length and forming several curved rows in each said sub-array.

6. The MEMS capacitive force sensor of claim 1 or 2, wherein said springs being longitudinally extended springs having a high ratio of the longitudinal stiffness to the transverse stiffness to allow for a large travel range of the moving structure, whereby said longitudinal stiffness is the stiffness along the axis parallel to the longest dimension of the spring, and said traverse stiffness is the stiffness perpendicular to the axis along the longest dimension of the spring.

7. The MEMS capacitive force sensor of claim 1 or 2, wherein said springs being extended radially inwards.

8. The MEMS capacitive force sensor of claim 1 or 2, wherein the thickness of said springs being the same as the height of said apertures, whereby eliminating the fabrication step needed for etching the second plate to soften the springs, thereby simplifying the fabrication process.

9. The MEMS capacitive force sensor of claim 1 or 2, wherein the tops of a plurality of said teeth are at the same plane as the bottom surface of said second plate.

10. The MEMS capacitive force sensor of claim 1 or 2, wherein the teeth-height of a plurality of teeth are greater than the height of said apertures to fully engage said teeth with said apertures during a sensor operation without causing a short circuit.

* * * * *